(12) United States Patent
Dunham

(10) Patent No.: US 12,275,376 B1
(45) Date of Patent: Apr. 15, 2025

(54) HYDRAULIC E-BIKE CARRIER

(71) Applicant: Jeffrey L. Dunham, Shell Lake, WI (US)

(72) Inventor: Jeffrey L. Dunham, Shell Lake, WI (US)

(*) Notice: Subject to any disclaimer, the term of this patent is extended or adjusted under 35 U.S.C. 154(b) by 0 days.

(21) Appl. No.: 18/809,492

(22) Filed: Aug. 20, 2024

(51) Int. Cl.
　　*B60R 9/10*　　(2006.01)
　　*B62B 3/02*　　(2006.01)
　　*B62B 3/10*　　(2006.01)
　　*B62B 5/00*　　(2006.01)

(52) U.S. Cl.
　　CPC ............... *B60R 9/10* (2013.01); *B62B 3/02* (2013.01); *B62B 3/10* (2013.01); *B62B 5/0003* (2013.01); *B62B 2202/90* (2013.01); *B62B 2206/003* (2013.01); *B62B 2206/006* (2013.01); *B62B 2206/06* (2013.01)

(58) Field of Classification Search
　　CPC ..... B60R 9/06; B60R 9/10; B60R 2011/0084; B60R 2011/0085; B62B 5/0003; B62B 2202/40; B62B 2202/90; B62B 2206/006; B62B 2206/02; B62B 2206/04; B62B 2205/30

See application file for complete search history.

(56) References Cited

U.S. PATENT DOCUMENTS

| | | | | |
|---|---|---|---|---|
| 3,207,396 | A * | 9/1965 | Mundell | B60R 9/10 224/500 |
| 6,502,730 | B2 * | 1/2003 | Johnson | B60R 9/10 224/924 |
| 11,447,076 | B1 * | 9/2022 | Mercurio | B60R 9/06 |
| 2004/0004099 | A1 * | 1/2004 | Crouch | B60R 9/10 224/504 |
| 2019/0176552 | A1 * | 6/2019 | Withrow | B60D 1/60 |
| 2023/0001860 | A1 * | 1/2023 | Schroeder | B60R 9/10 |
| 2024/0075885 | A1 * | 3/2024 | Stahl | B60R 9/06 |
| 2024/0208429 | A1 * | 6/2024 | Whited, Jr. | B60R 9/06 |
| 2024/0336206 | A1 * | 10/2024 | Lollie | B60R 9/10 |

* cited by examiner

Primary Examiner — Glenn F Myers
(74) Attorney, Agent, or Firm — Gugliotta & Gugliotta, LPA

(57) ABSTRACT

A vehicle-mounted bike carrier specifically designed for electric bicycles, featuring a hydraulic lifting mechanism for easy loading and unloading, a sliding hitch for convenient access to the vehicle's tailgate or trunk, foldable cradles for the wheels, and a compact design for easy storage. The carrier allows users, especially those with limited physical strength, to transport heavy e-bikes safely and efficiently.

20 Claims, 10 Drawing Sheets

HYDRAULIC E-BIKE CARRIER

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to vehicle-mounted bike carriers and, more particularly, to a hydraulic e-bike carrier designed for the effortless loading, unloading, and transport of heavy electric bicycles.

2. Description of the Related Art

Electric bicycles (e-bikes) have become increasingly popular due to their ability to assist riders with motorized power, making longer commutes and hilly terrains more manageable. However, e-bikes are much heavier than traditional bicycles due to the inclusion of batteries, motors, and other electronic components. This increased weight poses significant challenges for users when transporting these bicycles using vehicle-mounted bike carriers.

Traditional bike carriers are not optimized for the heavier weight of e-bikes, requiring users to lift the bikes manually, which can lead to physical strain and potential injuries. This is particularly problematic for elderly individuals, those with physical disabilities, or users with diminished strength.

Many existing bike carriers also require detachment from the vehicle to access the trunk or tailgate, adding inconvenience. Additionally, conventional carriers that do not fold or compact down take up significant space when not in use, which can be problematic for users with limited storage space.

There is a clear need for a bike carrier that simplifies the process of loading and unloading heavy e-bikes, provides secure transportation, and offers easy storage when not in use.

SUMMARY OF THE INVENTION

It is thus an object of the present invention to provide a vehicle-mounted bike carrier that facilitates the easy and safe loading, unloading, and transport of heavy electric bicycles through the use of a hydraulic lifting mechanism, sliding hitch, and compact storage design.

It is a feature of the present invention to incorporate an electric hydraulic lifting mechanism that allows for the effortless raising and lowering of heavy electric bicycles onto a vehicle-mounted bike carrier, significantly reducing the physical strain typically associated with loading and unloading such bikes. This hydraulic system is complemented by a sliding hitch for convenient access to the vehicle's tailgate or trunk and foldable cradles for easy storage, making the carrier user-friendly and accessible for individuals with limited physical strength.

The present invention provides a vehicle-mounted bike carrier designed to simplify the loading, unloading, and transport of heavy electric bicycles. A main feature is an electric hydraulic lifting mechanism that effortlessly raises and lowers e-bikes, eliminating the need for manual lifting and reducing physical strain. The carrier includes a sliding hitch that allows access to the vehicle's tailgate or trunk without detachment, and foldable cradles that function as ramps for easy bike loading and securely hold the wheels during transport. When not in use, the carrier compacts into a small, wheeled platform for convenient storage, making it particularly beneficial for elderly users, those with physical disabilities, and anyone needing an easier way to transport heavy e-bikes.

It is an advantage of the present invention to provide a vehicle-mounted bike carrier that simplifies the loading and unloading of heavy electric bicycles.

It is another advantage of the present invention to incorporate a hydraulic lifting mechanism, eliminating the need for manual lifting and reducing physical strain.

It is an advantage of the present invention to include a sliding hitch, allowing the carrier to remain attached while accessing the vehicle's tailgate or trunk.

It is another advantage of the present invention to feature foldable cradles, making storage more convenient and space efficient.

It is an advantage of the present invention to design the carrier to fold into a compact 1-foot by 5-foot platform on wheels, facilitating easy storage when not in use.

It is another advantage of the present invention to have stabilizing bars that swing down to secure the bike's seat or handlebars, ensuring safe transport.

It is an advantage of the present invention to be made from durable materials like steel or aluminum, providing strength and longevity.

It is another advantage of the present invention to be powered by a 12V plug that connects to the vehicle's trailer light connector, offering convenient electrical integration.

It is an advantage of the present invention to be accessible and usable by elderly individuals, those with physical disabilities, and users with diminished strength.

It is another advantage of the present invention to prevent injuries by eliminating the need for heavy lifting and providing a user-friendly design for transporting e-bikes.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
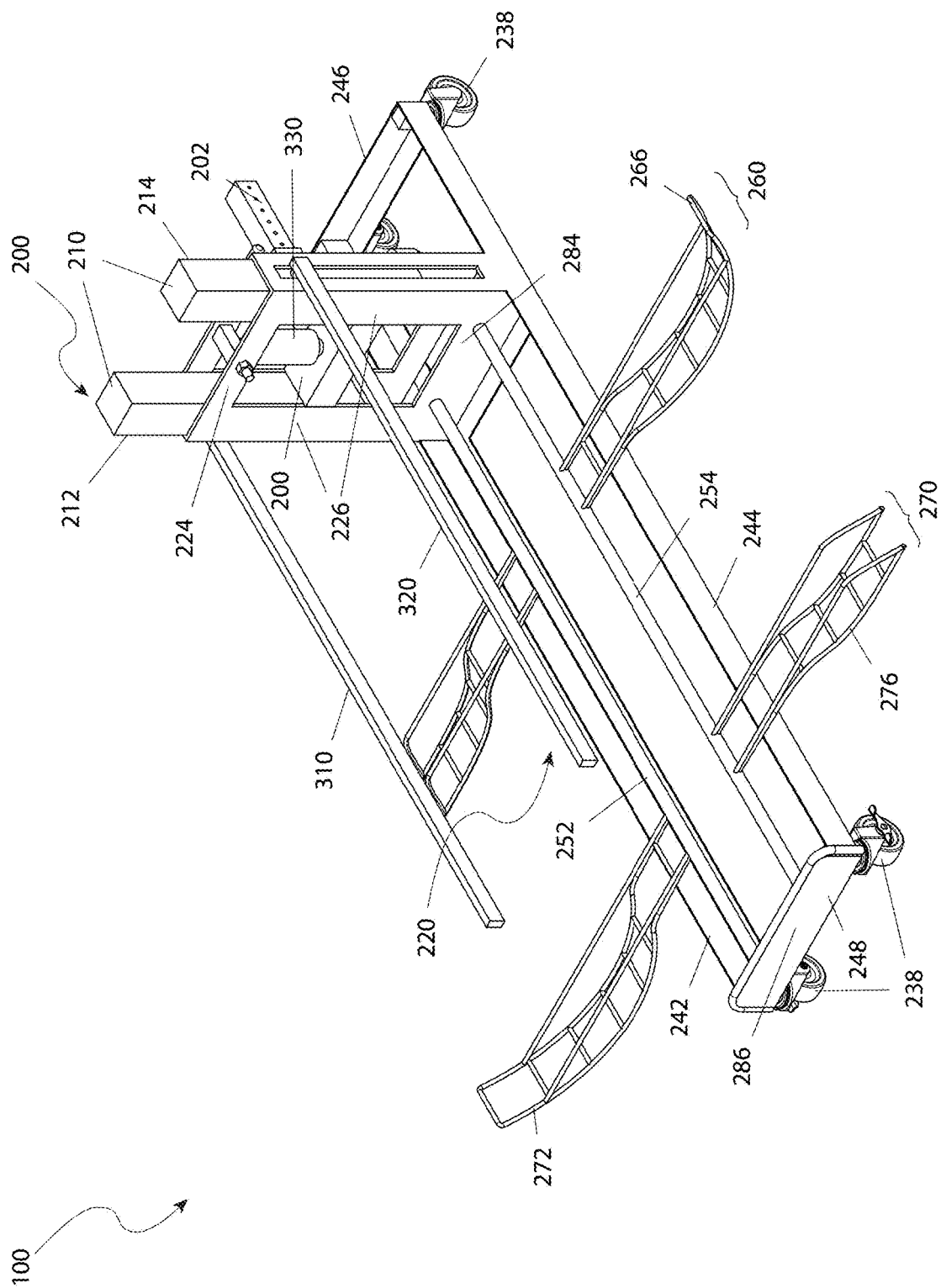
FIG. 1 is an isometric rear view of an E-bike carrier 100, according to an embodiment of the present invention.
Figure 2:
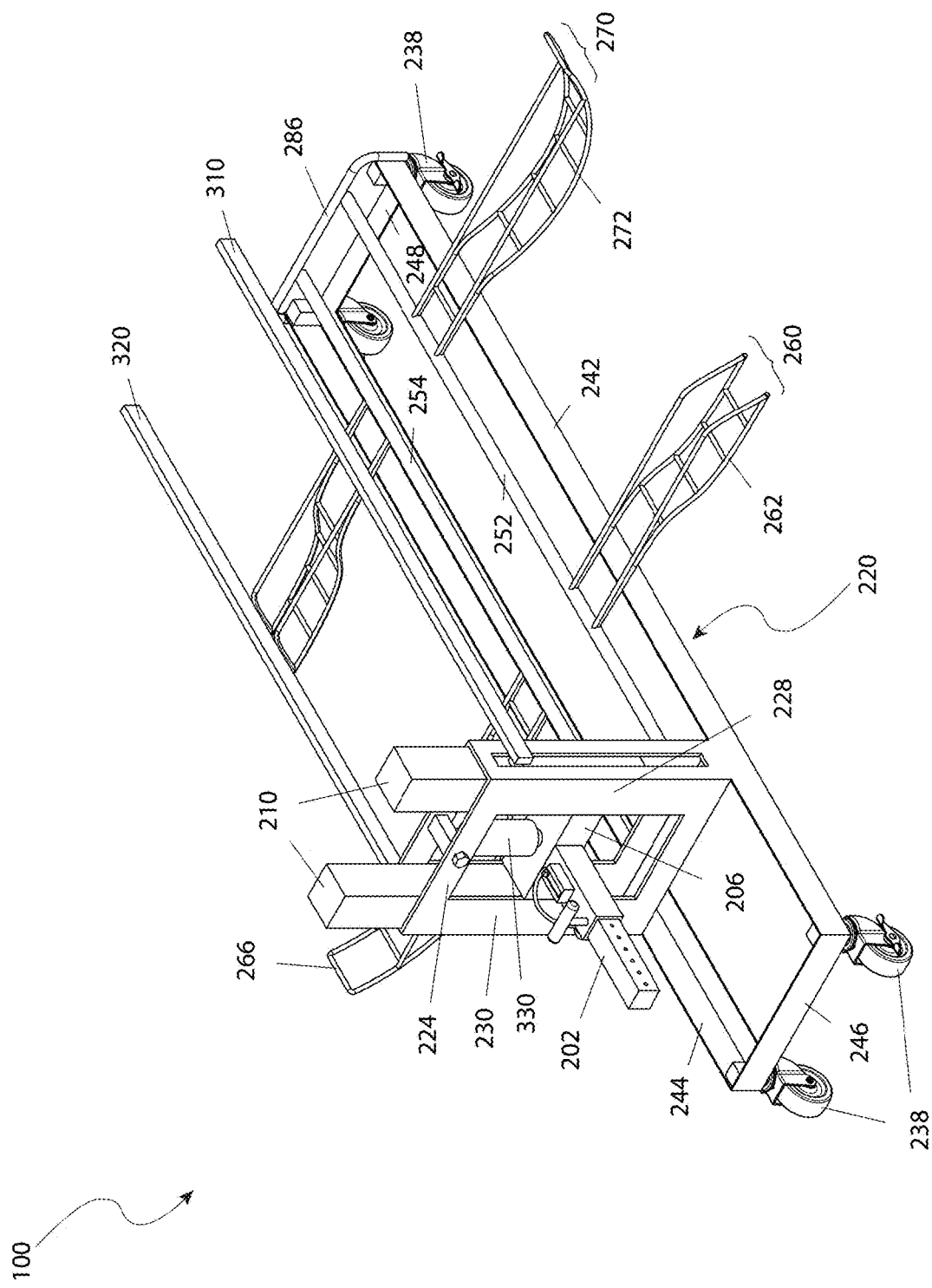
FIG. 2 is an isometric front view of an E-bike carrier 100, according to an embodiment of the present invention.
Figure 3:
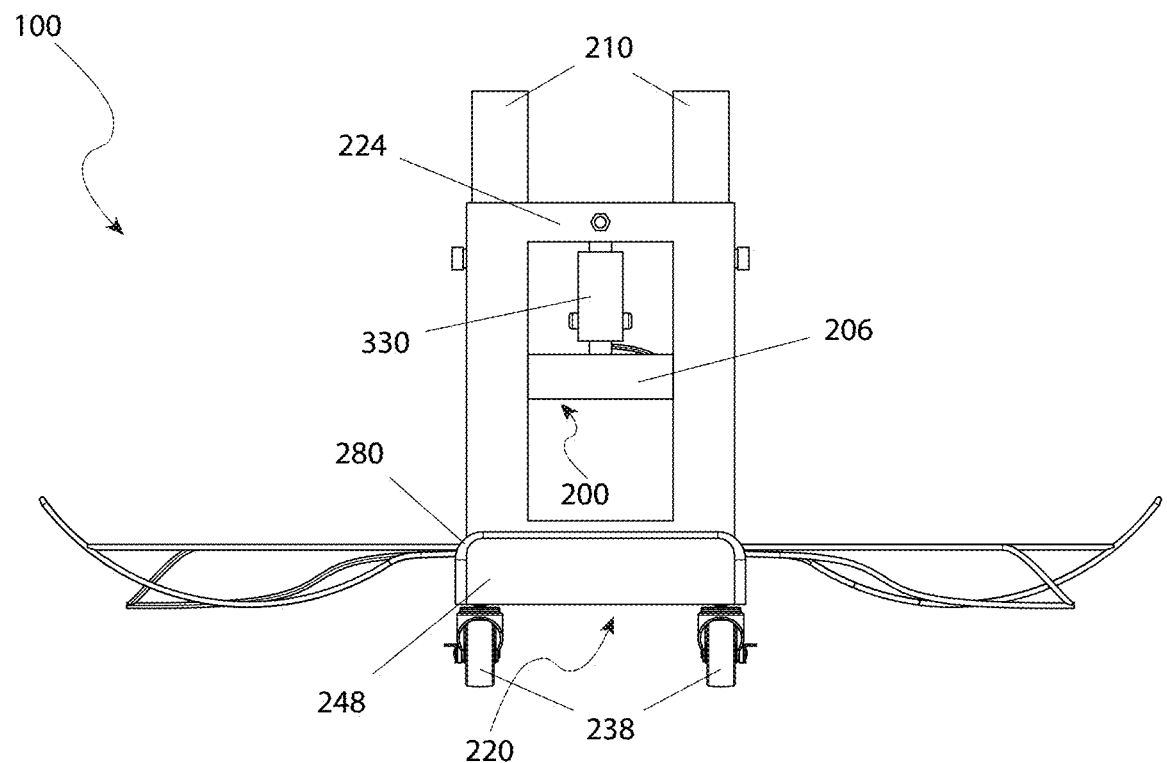
FIG. 3 is a rear view of an E-bike carrier 100, according to an embodiment of the present invention.
Figure 4:
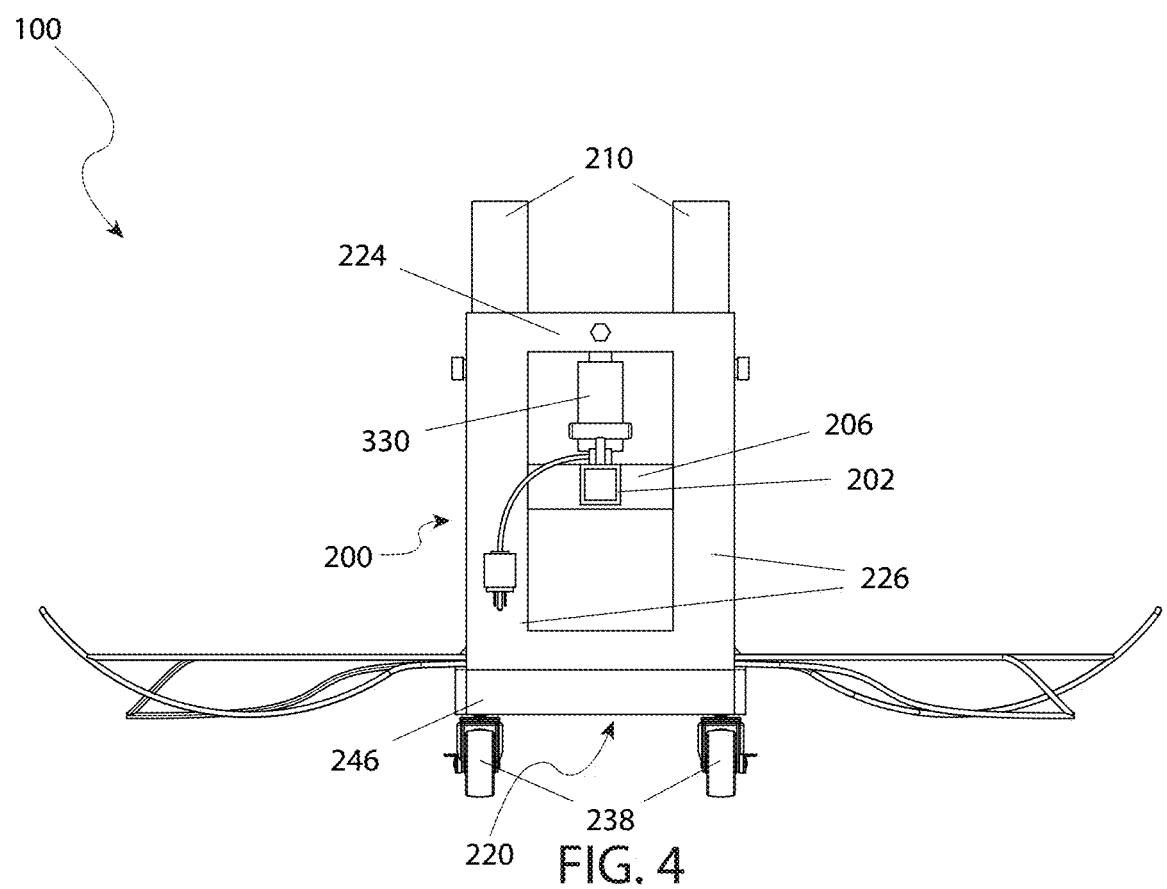
FIG. 4 is a front view of an E-bike carrier 100, according to an embodiment of the present invention.
Figure 5:
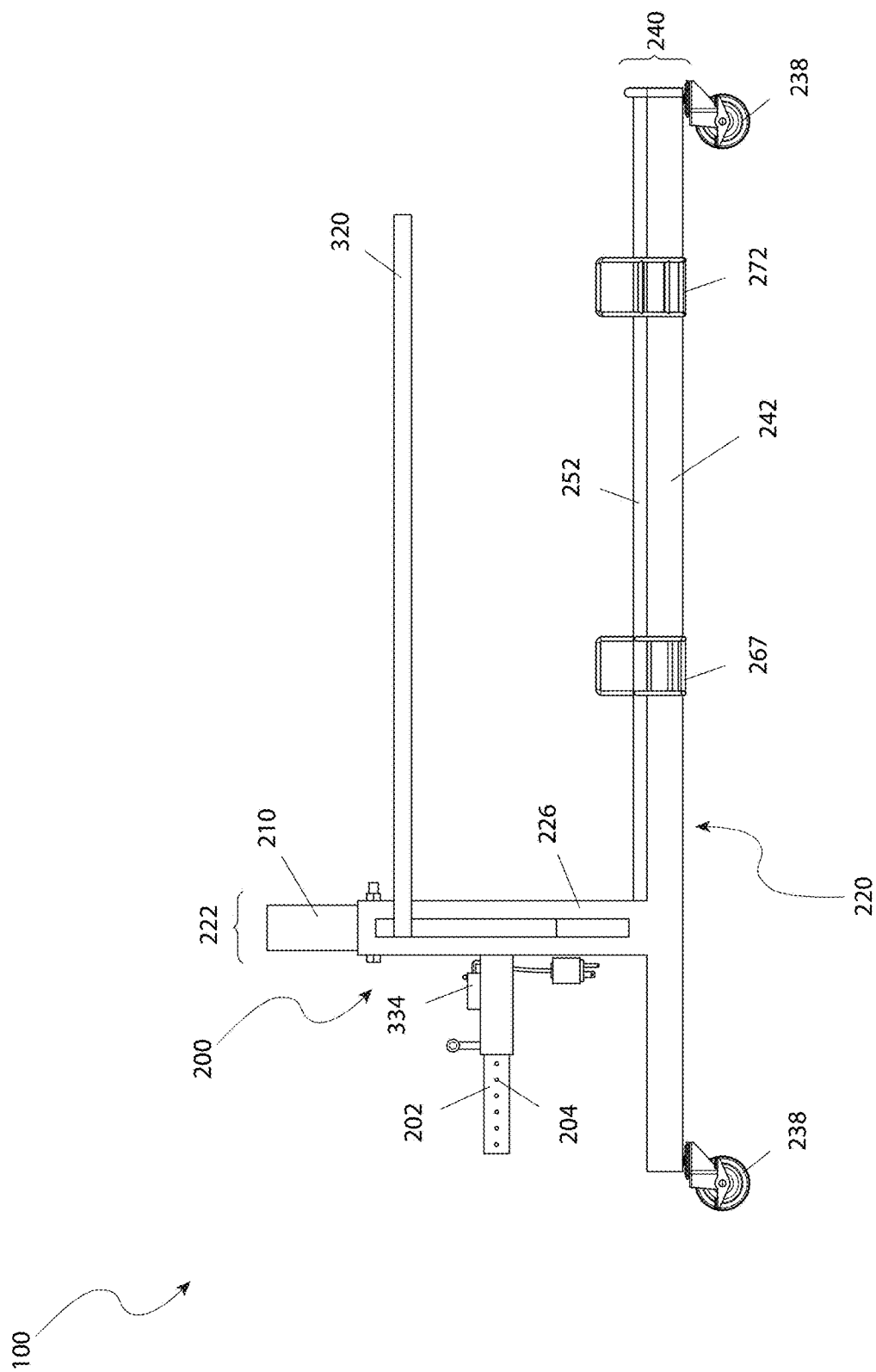
FIG. 5 is a left side view of an E-bike carrier 100, according to an embodiment of the present invention.
Figure 6:
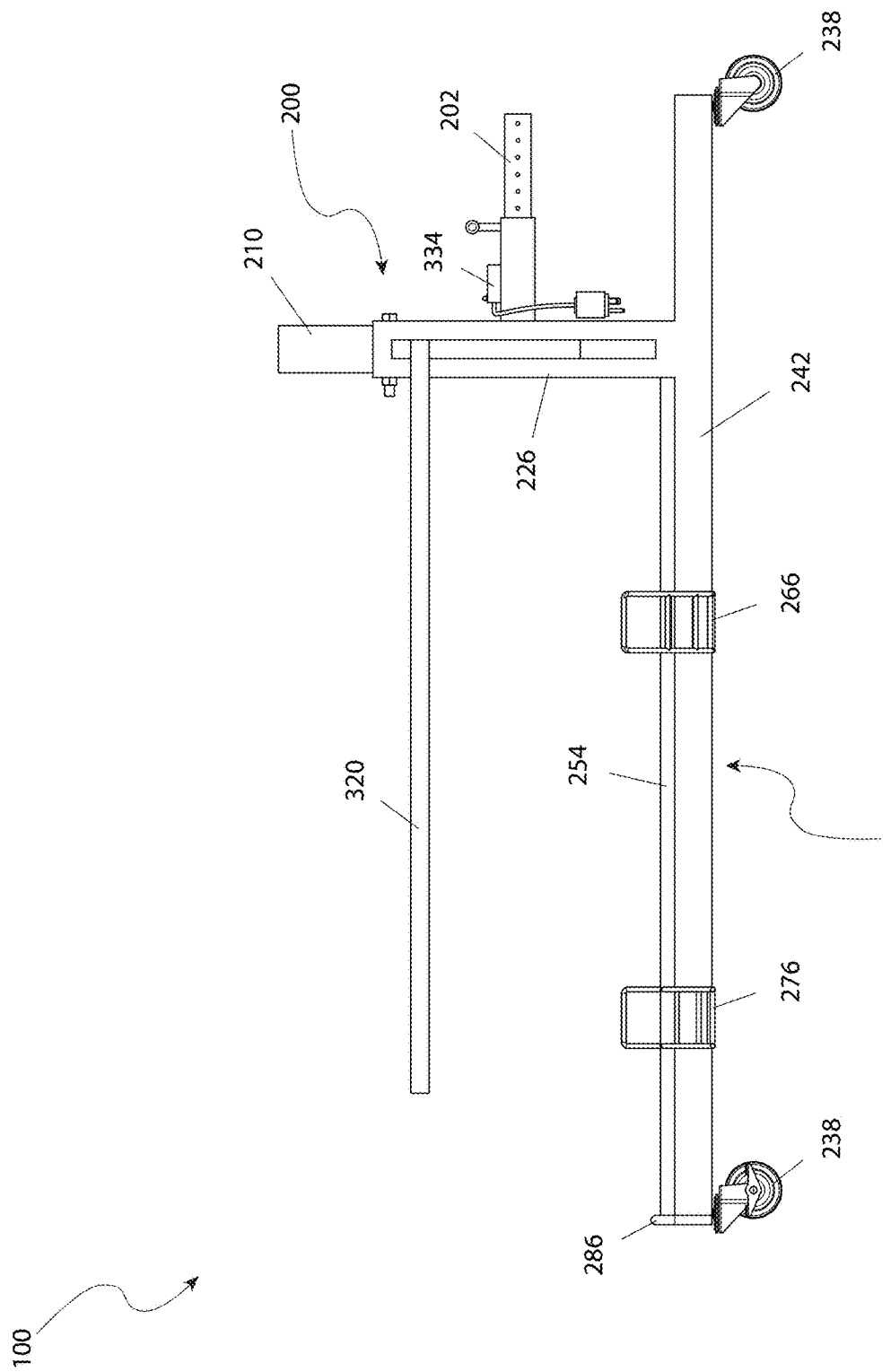
FIG. 6 is a right-side view of an E-bike carrier 100, according to an embodiment of the present invention.
Figure 7:
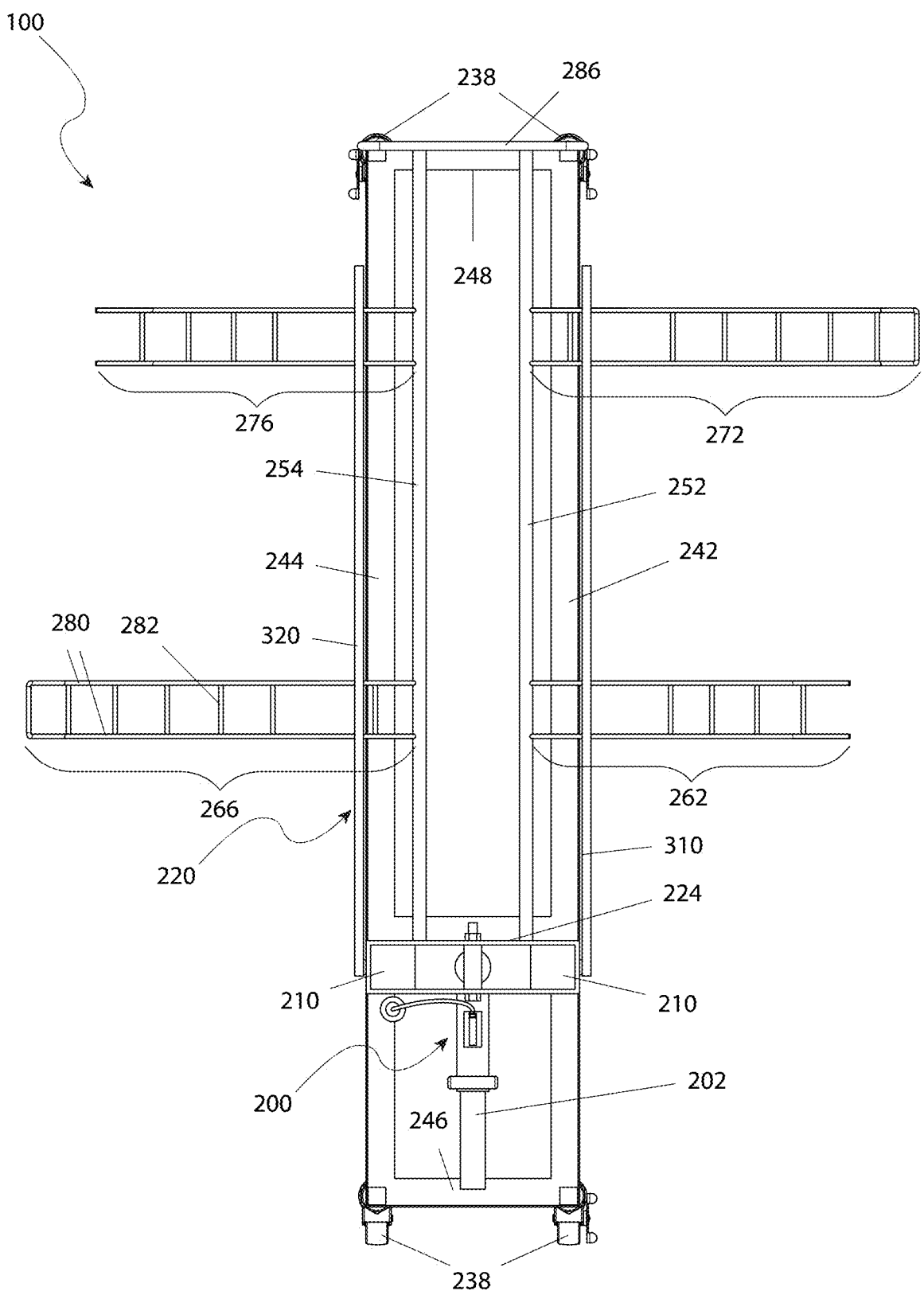
FIG. 7 is a top view of an E-bike carrier 100, according to an embodiment of the present invention.
Figure 8:
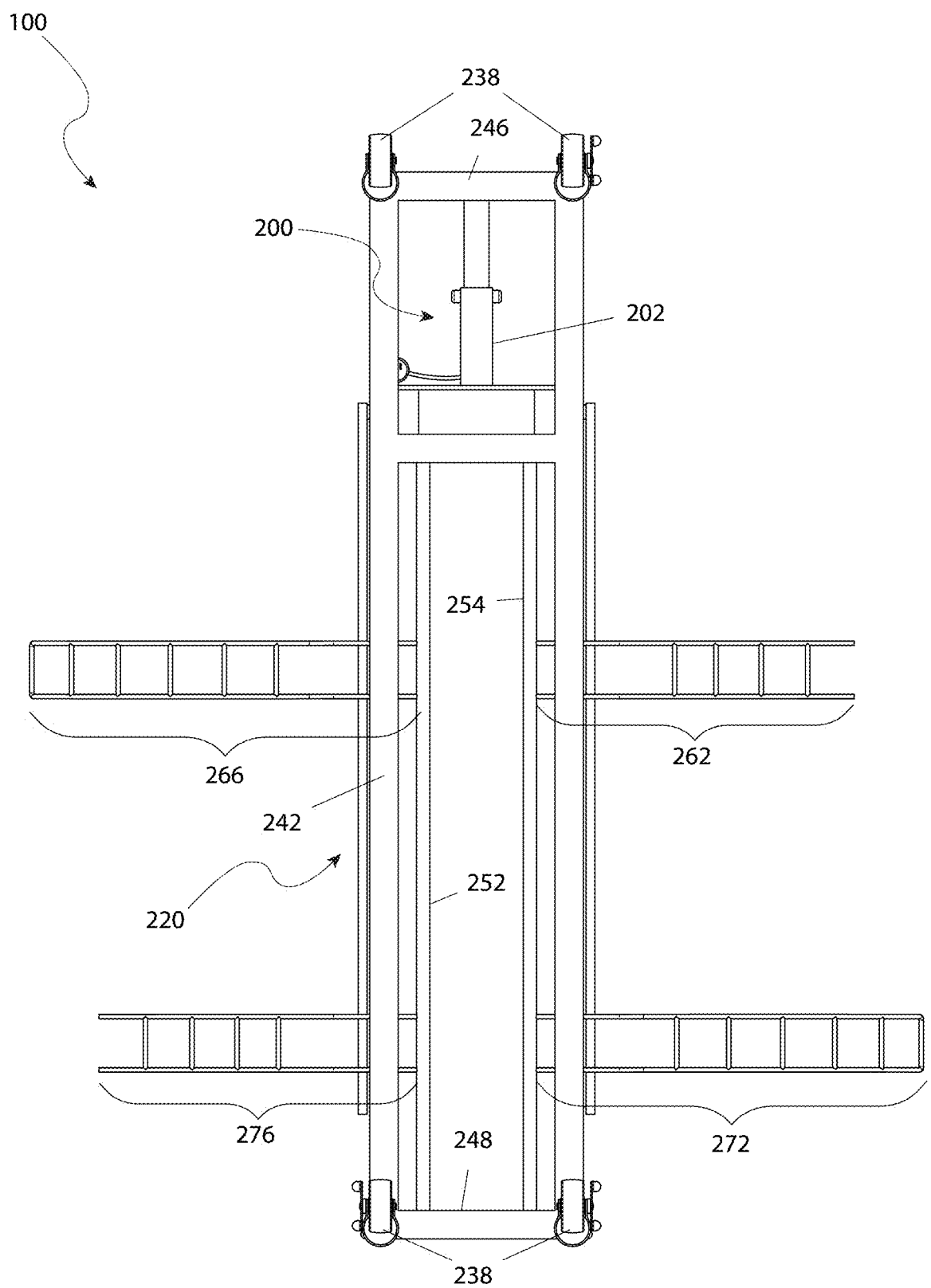
FIG. 8 is a bottom view of an E-bike carrier 100, according to an embodiment of the present invention.
Figure 9:
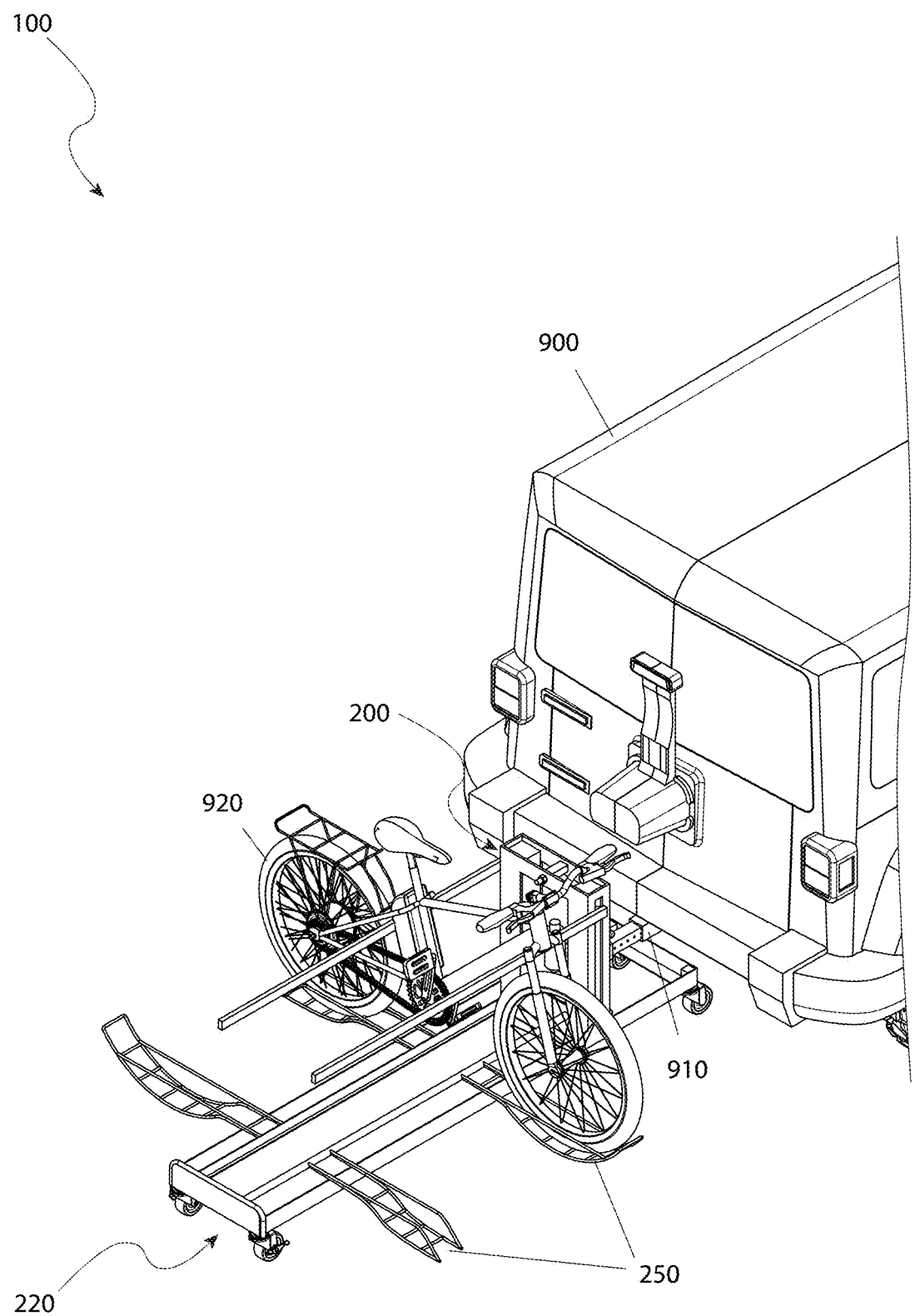
FIG. 9 is an isometric in-use view of an E-bike carrier 100, according to an embodiment of the present invention.
Figure 10:
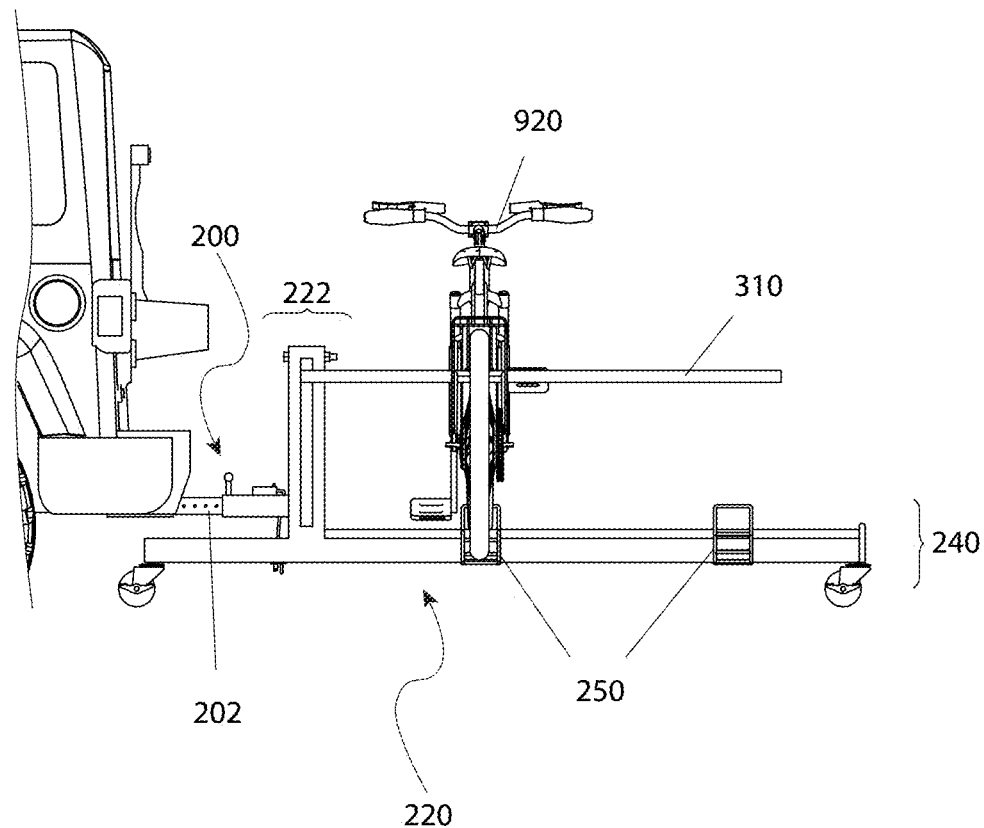
FIG. 10 is a side in-use of an E-bike carrier 100, according to an embodiment of the present invention; and, FIG. 11 is an exploded view of an E-bike carrier 100, according to an embodiment of the present invention.
Figure 11:
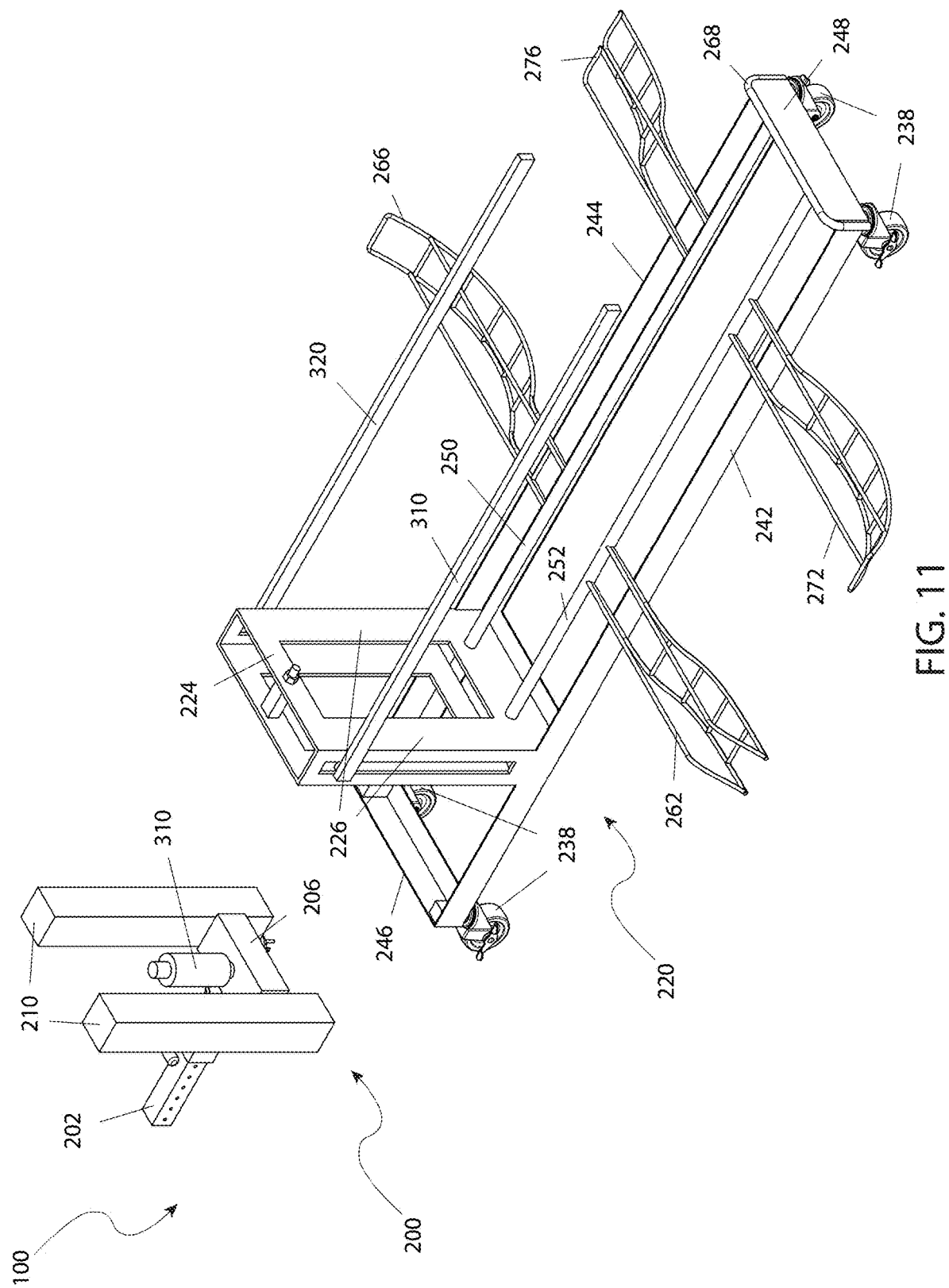

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (f).

The best mode for carrying out the invention is presented in terms of its preferred embodiment, herein depicted within the Figures.

1. DETAILED DESCRIPTION OF THE FIGURES

Referring now to the drawings, wherein like reference numerals indicate the same parts throughout the several views, an E-bike carrier (herein described as the "invention") and generally noted as 100 is shown according to the preferred embodiment of the present invention. The invention 100 may comprise a stationary component 200, a moving component 220, and a linear actuator 330. The stationary component 200 may detachably couple to a receiver tube of a hitch 910 on a vehicle 900. The moving component 220 may slidably couple to the stationary component 200. The linear actuator 330 may be coupled between the stationary component 200 and the moving component 220 such that the linear actuator 330 may raise and lower the moving component 220 relative to the stationary component 200. The moving component 220 may comprise a pair of bicycle carriers 250 upon which one (1) or more electric bicycles 920 may be carried. The moving component 220 may be lowered to position the pair of bicycle carriers 250 at ground level for loading one (1) or more electric bicycles 920 and may be raised to transport one (1) or more electric bicycles 920.

The stationary component 200 may comprise a hitch tube 202, a first lateral cross member 206, and a pair of vertical armatures 210. The proximal end of the hitch tube 202 may slide into the receiver tube and may be retained by a hitch pin inserted through a pin aperture 204 on the hitch tube 202 and a corresponding aperture on the receiver tube. The first lateral cross member 206 may be coupled to the top of the distal end of the hitch tube 202 such that the hitch tube 202 and the first lateral cross member 206 form a "T"-shape when viewed from above. The pair of vertical armatures 210 may be coupled to the top of the first lateral cross member 206 and may extend vertically upwards from the first lateral cross member 206. The pair of vertical armatures 210 may be operable to guide up and down movements of the moving component 220. In some embodiments, the vehicle 900 may be a truck and the length of the hitch tube 202 may position the pair of vertical armatures 210 such that a tailgate of the truck may be opened without striking any portion of the invention 100.

The moving component 220 may comprise a vertical frame 222, a horizontal frame 240, the pair of bicycle carriers 250, and a pair of top retention bars. The vertical frame 222 may be coupled to the horizontal frame 240 such that the horizontal frame 240 and the vertical frame 222 move simultaneously. The vertical frame 222 may slidably couple to the stationary component 200. The pair of bicycle carriers 250 may be coupled to the horizontal frame 240. The pair of top retention bars may be pivotably coupled to the lateral sides of the vertical frame 222 at the top of the vertical frame 222.

The vertical frame 222 may comprise a pair of vertical guides 226 and a second lateral cross member 224. The pair of vertical guides 226 may be vertically oriented and parallel to each other. The bottoms of the pair of vertical guides 226 may be coupled to the front half of the horizontal frame 240. The second lateral cross member 224 may be coupled between the tops of the pair of vertical guides 226 such that the second lateral cross member 224 is oriented laterally and is positioned above the first lateral cross member 206. The bottom of the linear actuator 330 may be coupled to the first lateral cross member 206 and the top of the linear actuator 330 may be coupled to the second lateral cross member 224 such that expansion of the linear actuator 330 may increase the separation distance between the first lateral cross member 206 and the second lateral cross member 224 and contraction of the linear actuator 330 may decrease the separation distance between the first lateral cross member 206 and the second lateral cross member 224 To aid in understanding the invention, reference numeral 267 represents a stabilizing pin for the linear actuator 330 and reference numeral 268 represents a safety lock indicator light.

The pair of vertical guides 226 and the pair of vertical armatures 210 may be U-channels of different sizes. The pair of vertical guides 226 may be larger than the pair of vertical armatures 210 and the U-channels may be oriented such that the pair of vertical armatures 210 may be nested within the pair of vertical guides 226. Specifically, a left vertical armature 212 may be nested within a left vertical guide 228 and a right vertical armature 214 may be nested within a right vertical guide 230. This arrangement of the pair of vertical armatures 210 within the pair of vertical guides 226 may enable the pair of vertical armatures 210 to slide up and down within the pair of vertical guides 226 and may prevent the pair of vertical armatures 210 from moving horizontally in any direction.

The horizontal frame 240 may be oriented from front to rear and may be coupled to the vertical frame 222 to form a right angle. In some embodiments, the horizontal frame 240 may comprise a left horizontal armature 242, a right horizontal armature 244, a front horizontal armature 246, and a rear horizontal armature 248. As non-limiting examples, the left horizontal armature 242, the right horizontal armature 244, the front horizontal armature 246, and the rear horizontal armature 248 may be a plurality of aluminum or steel angles.

The horizontal frame 240 may comprise a plurality of caster wheels 238 which may aid in moving the invention 100 when the invention 100 is detached from the vehicle 900. The plurality of caster wheels 238 may be coupled to the bottom of the horizontal frame 240 at each corner of the horizontal frame 240.

The pair of bicycle carriers 250 may comprise a front bicycle cradle 260, a rear bicycle cradle 270, a left pivot rod 252, a right pivot rod 254, a front pivot rod support 284, and a rear pivot rod support 286. The left pivot rod 252 and the right pivot rod 254 may be parallel to each other and may be oriented front to rear within a horizontal plane that parallels the horizontal frame 240. The left pivot rod 252 and the right pivot rod 254 may be supported at the front by the front pivot rod support 284 and at the rear by the rear pivot rod support 286. The left pivot rod 252 and the right pivot rod 254 may be pivotably coupled to the front pivot rod support 284 and to the rear pivot rod support 286. In some embodiments, the front pivot rod support 284 may be incorporated into the vertical frame 222.

The front bicycle cradle 260 may be divided into a front left cradle half 262 and a front right cradle half 266. The rear bicycle cradle 270 may be divided into a rear left cradle half 272 and a rear right cradle half 276. The front left cradle half 262 and the rear left cradle half 272 may be coupled to the left pivot rod 252. The front right cradle half 266 and the rear right cradle half 276 may be coupled to the right pivot rod 254. The front left cradle half 262 and the rear left cradle half 272 may pivot between horizontal and vertical orientations by rotating the left pivot rod 252. The front right cradle half 266 and the rear right cradle half 276 may pivot between horizontal and vertical orientations by rotating the right pivot rod 254.

The front bicycle cradle 260 may carry a first electric bicycle. The front left cradle half 262 and the front right cradle half 266 may pivot down to the horizontal orientation for transporting the first electric bicycle. The front left cradle half 262 and the front right cradle half 266 may pivot up to the vertical orientation for storing the invention 100. The front left cradle half 262 may be substantially flat such that the first electric bicycle may be pushed onto the front bicycle cradle 260 by rolling the first electric bicycle over the front left cradle half 262 and onto the front right cradle half 266. The front right cradle half 266 may curve upwards to limit the distance that the first electric bicycle may move onto the front bicycle cradle 260. A front left tire retainer may retain a first bicycle rear wheel to the front left cradle half 262 and a front right tire retainer may retain a first bicycle front wheel to the front right cradle half 266 while transporting the first electric bicycle.

The rear bicycle cradle 270 may carry a second electric bicycle. The rear right cradle half 276 and the rear left cradle half 272 may pivot down to the horizontal orientation for transporting the second electric bicycle. The rear right cradle half 276 and the rear left cradle half 272 may pivot up to the vertical orientation for storing the invention 100. The rear right cradle half 276 may be substantially flat such that the second electric bicycle may be pushed onto the rear bicycle cradle 270 by rolling the second electric bicycle over the rear right cradle half 276 and onto the rear left cradle half 272. The rear left cradle half 272 may curve upwards to limit the distance that the second electric bicycle may move onto the rear bicycle cradle 270. A rear right tire retainer may retain a second bicycle rear wheel to the rear right cradle half 276 and a rear left tire retainer may retain a second bicycle front wheel to the rear left cradle half 272 while transporting the second electric bicycle.

As a non-limiting example, an individual cradle half may comprise a pair of cradle side rails 280 and a plurality of cradle cross braces 282. The pair of cradle side rails 280 may be oriented longitudinally along the individual cradle half with the plurality of cradle cross braces 282 connecting the pair of cradle side rails 280. An individual bicycle wheel may travel over the plurality of cradle cross braces 282 and may be guided by the pair of cradle side rails 280.

The pair of top retention bars may be pivotably coupled to the top of the vertical frame 222. The pair of top retention bars may individually pivot between a vertical orientation and a horizontal orientation. In the horizontal orientation, the pair of top retention bars may extend from the vertical frame 222 towards the rear of the invention 100, passing over the front bicycle cradle 260 and the rear bicycle cradle 270. The pair of top retention bars may be pivoted to the vertical orientation when loading or unloading the electric bicycles 920 and may be pivoted to the horizontal orientation to retain the electric bicycles 920 on the invention 100.

The pair of top retention bars may comprise a left top retention bar 310 that may be pivotably coupled to the left side of the vertical frame 222 and a right top retention bar 320 that may be pivotably coupled to the right side of the vertical frame 222. As non-limiting examples, the left top retention bar 310 may pivot into a position resting on the seat of the first electric bicycle and may be detachably coupled to the seat using a left top retention strap and the right top retention bar 320 may pivot into a position resting on the seat of the second electric bicycle and may be detachably coupled to the seat using a right top retention strap.

The linear actuator 330 may create straight-line motion when energized by an electrical potential. The linear actuator 330 may move opposing ends of the linear actuator 330 away from each other responsive to a first polarity of the electrical potential or towards each other responsive to a second polarity of the electrical potential where the second potential is opposite of the first potential. The ends of the linear actuator 330 may remain stationary in the absence of the electrical potential. An operator control 334 may be adapted to be used by a user in order to determine the energization and de-energization of the linear actuator 330 and the polarity of the energization. The linear actuator 330 may be powered from the electrical system of the vehicle 900 by plugging a carrier electrical connector and wiring into a vehicle electrical connector.

2. Operation of the Preferred Embodiment

In use, the invention 100 may be moved into position behind the vehicle 900 by rolling the invention 100 on the plurality of caster wheels 238. The hitch tube 202 may be placed into the receiver tube of the hitch 910 and the hitch pin may secure the invention 100 to the hitch 910.

The first electric bicycle may be placed onto the front bicycle cradle 260 by rolling the first electric bicycle over the front left cradle half 262 and onto the front right cradle half 266 such that the first bicycle front wheel stops on the front right cradle half 266 and the first bicycle rear wheel stops on the front left cradle half 262. The first bicycle rear wheel may be retained on the front left cradle half 262 by the front left tire retainer and the first bicycle front wheel may be retained on the front right cradle half 266 by the front right tire retainer.

The second electric bicycle may be placed onto the rear bicycle cradle 270 by rolling the second electric bicycle over the rear right cradle half 276 and onto the rear left cradle half 272 such that the second bicycle front wheel stops on the rear left cradle half 272 and the second bicycle rear wheel stops on the rear right cradle half 276. The second bicycle rear wheel may be retained on the rear right cradle half 276 by the rear right tire retainer and the second bicycle front wheel may be retained on the rear left cradle half 272 by the rear left tire retainer.

When electric bicycles 920 are in place, the left top retention bar 310, the right top retention bar 320, or both may be lowered to rest on the electric bicycles 920 and may be retained using the left top retention strap, the right top retention strap, or both.

The user may raise the electric bicycles 920 by energizing the linear actuator 330 to lift the moving component 220 of the invention 100 above the ground.

The electric bicycles 920 may be removed from the invention 100 by reversing the stops recited above.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application. At least one specification heading is required.

What is claimed is:

1. A vehicle-mounted bike carrier for electric bicycles, comprising:
    a stationary component detachably coupled to a receiver tube of a vehicle hitch;
    a moving component slidably coupled to the stationary component;
    a hydraulic lifting mechanism coupled between the stationary component and the moving component for raising and lowering the moving component;
    two bicycle carriers on the moving component for supporting one or more electric bicycles;
    foldable cradles for the bike wheels, wherein one side of each cradle functions as a ramp for loading the bicycle and the other side securely holds the wheels;
    a sliding hitch that allows the carrier to remain attached while accessing the vehicle's tailgate or trunk;
    a pair of top bars that swing down to secure a bike's seat or handlebars;
    a compact design that folds into a 1-foot by 5-foot platform on wheels for easy storage.

2. The vehicle-mounted bike carrier of claim 1, wherein the hydraulic lifting mechanism is powered by a 12V plug that connects to the vehicle's trailer light connector.

3. The vehicle-mounted bike carrier of claim 1, wherein the stationary component comprises:
    a hitch tube that slides into the receiver tube and is retained by a hitch pin;
    a first lateral cross member coupled to the top of the distal end of the hitch tube;
    a pair of vertical armatures coupled to the top of the first lateral cross member and extending vertically.

4. The vehicle-mounted bike carrier of claim 1, wherein the moving component comprises:
    a vertical frame coupled to a horizontal frame, both of which move simultaneously;
    the two bicycle carriers coupled to the horizontal frame;
    the top retention bars pivotably coupled to the lateral sides of the vertical frame at the top.

5. The vehicle-mounted bike carrier of claim 4, wherein the vertical frame comprises:
    a pair of vertical guides that are vertically oriented and parallel;
    a second lateral cross member coupled between the tops of the pair of vertical guides;
wherein a linear actuator creates straight-line motion when energized by an electrical potential, moving the ends of the actuator away from or towards each other responsive to the polarity of the electrical potential;
wherein the horizontal frame comprises a plurality of caster wheels to aid in moving the carrier when detached from the vehicle; and wherein the foldable cradles and top retention bars are designed to secure the bicycles during transport and fold for compact storage.

6. A vehicle-mounted bike carrier for electric bicycles, comprising:
a stationary component detachably coupled to a receiver tube of a vehicle hitch;
a moving component slidably coupled to the stationary component;
a hydraulic lifting mechanism coupled between the stationary component and the moving component, configured to raise and lower the moving component relative to the stationary component;
a pair of bicycle carriers mounted on the moving component, each bicycle carrier configured to support an electric bicycle;
foldable cradles on each bicycle carrier, wherein each cradle comprises:
a first side that functions as a loading ramp for an electric bicycle wheel;
a second side configured to securely hold the electric bicycle wheel during transport;
a sliding hitch mechanism allowing the carrier to move horizontally relative to the vehicle while remaining attached, enabling access to the vehicle's tailgate or trunk;
stabilizing bars pivotably mounted to swing down and secure a portion of each electric bicycle;
a folding mechanism allowing the carrier to compact into a substantially flat configuration for storage.

7. The vehicle-mounted bike carrier of claim 6, wherein the hydraulic lifting mechanism is powered by a 12V electrical connection compatible with a vehicle's trailer light connector.

8. The vehicle-mounted bike carrier of claim 6, wherein the stationary component comprises:
a hitch tube configured to slide into and be retained within the receiver tube;
a first lateral cross member coupled to a distal end of the hitch tube;
a pair of vertical armatures coupled to and extending vertically from the first lateral cross member.

9. The vehicle-mounted bike carrier of claim 6, wherein the moving component comprises:
a vertical frame;
a horizontal frame coupled to the vertical frame;
the pair of bicycle carriers coupled to the horizontal frame;
a pair of top retention bars pivotably coupled to lateral sides of the vertical frame.

10. The vehicle-mounted bike carrier of claim 9, wherein the vertical frame comprises:
a pair of parallel, vertically oriented guides;
a second lateral cross member coupled between upper ends of the pair of vertical guides.

11. The vehicle-mounted bike carrier of claim 6, wherein the hydraulic lifting mechanism comprises a linear actuator creating straight-line motion when energized, the direction of motion determined by the polarity of an applied electrical potential.

12. The vehicle-mounted bike carrier of claim 6, further comprising a plurality of caster wheels coupled to the moving component to facilitate movement of the carrier when detached from the vehicle.

13. The vehicle-mounted bike carrier of claim 6, wherein the foldable cradles are pivotably mounted to rotate between a horizontal position for bicycle support and a vertical position for storage.

14. The vehicle-mounted bike carrier of claim 6, further comprising adjustable wheel retention straps on each foldable cradle.

15. The vehicle-mounted bike carrier of claim 6, wherein the stabilizing bars are length-adjustable to accommodate different bicycle sizes.

16. A method of loading an electric bicycle onto the vehicle-mounted bike carrier of claim 6, comprising:
lowering the moving component to ground level using the hydraulic lifting mechanism;
pivoting the foldable cradles to a horizontal position;
rolling the electric bicycle up the first side of the foldable cradles;
securing the electric bicycle wheels to the second side of the foldable cradles;
pivoting the stabilizing bars to secure the electric bicycle frame;
raising the moving component using the hydraulic lifting mechanism.

17. The vehicle-mounted bike carrier of claim 6, wherein the folding mechanism allows the carrier to compact into a configuration not exceeding 1 foot by 5 feet in its largest dimensions.

18. The vehicle-mounted bike carrier of claim 6, further comprising a control interface allowing a user to operate the hydraulic lifting mechanism.

19. The vehicle-mounted bike carrier of claim 6, wherein the pair of bicycle carriers are configured to support electric bicycles with a combined weight of at least 150 pounds.

20. The vehicle-mounted bike carrier of claim 6, further comprising a locking mechanism to secure the moving component in a raised position during transport.

* * * * *